United States Patent
Falcon et al.

(10) Patent No.: US 6,934,379 B2
(45) Date of Patent: *Aug. 23, 2005

(54) MULTIPLE CLIENT REMOTE AGENT NETWORK METHOD

(75) Inventors: Roland Falcon, West Palm Beach, FL (US); Richard Cherry, Miami, FL (US)

(73) Assignee: Willow CSN Incorporated, Miramar, FL (US)

( * ) Notice: Subject to any disclaimer, the term of this patent is extended or adjusted under 35 U.S.C. 154(b) by 352 days.

This patent is subject to a terminal disclaimer.

(21) Appl. No.: 09/988,456

(22) Filed: Nov. 20, 2001

(65) Prior Publication Data

US 2002/0076031 A1 Jun. 20, 2002

Related U.S. Application Data

(63) Continuation-in-part of application No. 09/237,517, filed on Jan. 25, 1999, now Pat. No. 6,320,956.

(51) Int. Cl.⁷ .............................................. H04M 3/00
(52) U.S. Cl. ........................ 379/265.02; 379/265.09; 379/265.11; 379/265.12; 379/266.09
(58) Field of Search .................... 379/88.17, 88.21, 379/212.01, 265.02, 265.09, 265.11, 265.12, 265.13, 266.09, 207.14, 207.15, 211.01, 211.02, 265.01

(56) References Cited

U.S. PATENT DOCUMENTS

| | | | |
|---|---|---|---|
| 5,073,890 A | | 12/1991 | Danielson |
| 5,291,550 A | * | 3/1994 | Levy et al. ................. 379/242 |
| 5,291,551 A | | 3/1994 | Conn et al. |
| 5,459,780 A | | 10/1995 | Sand |
| 5,546,456 A | * | 8/1996 | Vilsoet et al. .......... 379/266.08 |
| 5,557,667 A | * | 9/1996 | Bruno et al. ........... 379/211.04 |
| 5,563,937 A | * | 10/1996 | Bruno et al. ........... 379/265.11 |
| 5,586,178 A | * | 12/1996 | Koenig et al. ......... 379/265.03 |
| 5,633,924 A | * | 5/1997 | Kaish et al. ........... 379/266.03 |
| 5,703,943 A | * | 12/1997 | Otto ....................... 379/265.11 |
| 5,715,306 A | * | 2/1998 | Sunderman et al. ... 379/265.02 |
| 5,729,600 A | * | 3/1998 | Blaha et al. ........... 379/266.07 |
| 5,737,405 A | * | 4/1998 | Dezonno ................ 379/265.07 |
| 5,742,596 A | * | 4/1998 | Baratz et al. ................. 370/356 |
| 5,742,675 A | * | 4/1998 | Kilander et al. ........ 379/266.09 |
| 5,884,032 A | * | 3/1999 | Bateman et al. ............. 709/204 |
| 6,047,060 A | * | 4/2000 | Fedorov et al. ......... 379/265.02 |
| 6,175,564 B1 | * | 1/2001 | Miloslavsky et al. ........ 370/352 |
| 6,573,911 B2 | * | 6/2003 | Brockbank ................... 715/753 |

* cited by examiner

Primary Examiner—Bing Q. Bui
(74) Attorney, Agent, or Firm—Lott & Friedland, P.A.

(57) ABSTRACT

A method for distributing a customer-initiated call placed with a contact center to one or more remotely located agents trained to service calls for one or more contact centers comprising the steps of receiving the call at a contact center; deriving an array of caller information; transmitting the array of information to a coordination center servicing one or more contact centers; identifying at least one remotely located agent trained to receive said call; directing the call to the agent; tracking the number of calls received by the agent for said contact center and providing payroll services for the contact center; maintaining records of each customer-initiated call and providing the records to the contact center; establishing simultaneous communication between the coordination center, the agent and the contact center; monitoring the communications in the call and providing access to the contact center; and the contact center rendering assistance to the agent.

18 Claims, 3 Drawing Sheets

MULTIPLE CLIENT REMOTE AGENT NETWORK METHOD

CLAIM OF PRIORITY

This application is a continuation in part of U.S. patent application Ser. No. 09/237,517, filed on Jan. 25, 1999 now U.S. Pat. No. 6,320,956, the contents of which are incorporated herein by reference.

FIELD OF THE INVENTION

The present invention relates generally to the field of call centers for use in customer sales, customer support, marketing and customer service in a broad range of industries. Specifically, the present invention relates to a system enabling remotely located agents to work as members of a virtual automatic call distributor ("ACD") team, and more particularly, for remote agents at disparate geographic locations to be available to service one or more different call centers and to respond to calls or other forms of contact made by customers of the call centers.

BACKGROUND OF THE INVENTION

Call centers handle an increasing volume of telephonic inquiries for sales, information, customer support and other services. Typical call centers provide the ability to route a plurality of incoming, customer-initiated calls to agents which provide sales, information, or support on behalf of an entity (hereinafter referred to as the "client") interested in establishing or maintaining a relationship with the customer. With the advent of electronic telecommunications, incoming "calls" are no longer necessarily telephonic communications but can also encompass the broad range of new communication channels such as e-mail, interactive chat, instant messaging, video conferencing, voice messaging, and the like. Throughout this text, the generic term "calls" is used to designate the entire range of communication formats which a modem call center is capable of handling. Similarly, throughout this text, the term "contact center" is used to designate a generic call center which may be equipped to handle not only telephonic communications but also the other modes of communication discussed above. An ACD is utilized to selectively route the incoming calls. An ACD generally refers to a device that receives incoming voice calls, answers with a taped announcement, holds the calls with background music or a message, then automatically assigns the call on a first come first serve basis to the next available agent. In the present context, the required call routing system must be able to process, in addition to voice calls, the electronic types of communications described above. For purposes of this document the term Intelligent Queuing and Routing Engine ("IQRE") shall be used to describe such a call routing system. The IRQE will normally consist of an enterprise management system which, among its other components, incorporates an ACD to manage voice communications.

Modern IRQE systems selectively route incoming calls based on a number of factors such as the number called or dialed, the originating number, the queued sequence of the caller, the geographic location of the caller, accumulated caller history, and other relevant criteria. Once the IRQE has evaluated the inbound caller's information, if any, the IRQE searches for an available agent to service the call. Availability of agents may be dependent on any number of factors such as the skill level or schedule of the agent. The number of agents within the contact center and available to the IRQE is often limited by the physical space available for the agents to operate. A frequent problem experienced by contact centers is that there are often too few agents to handle the number of incoming customer calls. In those situations, the customer is frequently put on hold and made to wait until an agent becomes available. Many potential customers, when faced with an extended wait, simply terminate the call before the contact center has the opportunity to conduct a business transaction, thereby causing an economic loss. Additionally, customers calling for support or information may become disgruntled or unsatisfied with a business that is unable to provide a sufficient number of agents to service the call in a timely manner.

For most applications, an agent requires a direct communication link with both the customer who initiates the call and a central repository where data about the call and/or customer can be inputted and accessed. The agent communicates with the customer through either a telephone line or other method such as e-mail or Internet chat, and records whatever transactions take place through a computer terminal or a personal computer networked with the contact center's record system. Modem advancements in the field of electronics, computers and telecommunications have created standardized network protocols and hardware, yielding a constantly advancing global information infrastructure which can be used to establish reliable communication links. Local area networks ("LANs") based at a single geographic location have given rise to wide area networks ("WANs") which efficiently interconnect LANs spread over large geographic regions through the Internet or through private wireless or landline networks. In addition, home and business computers currently sold through normal retail channels offer integrated or optional components to communicate through standard networks including LANs, WANs, the Internet or a combination of the three.

Many problems experienced in conventional contact centers result from the use of fixed facilities that are both physically and geographically confined. Large call centers may select a geographically attractive location only to find a limited workforce in that area. Large contact centers typically pay for the training of their agents and simultaneously experience a high turnover rate. Furthermore, should the volume of calls exceed the capacity of the contact center, the traditional way to address the problem is either through outsourcing of services, through physical expansion of the facilities which is costly and time consuming, and/or by simply not answering, or "abandoning", the excess portion of the call volume.

In response, recent developments in the fields of telecommunications and information technology have been used to enable remotely situated contact center agents (sometimes called "home agents" and referred henceforth herein as "remote agents") to increase the number of call-takers available to handle contact center volume without necessitating an expansion of physical facilities. The benefits of using remote agents are obvious. Remote agents may work from home, reducing the need to physically expand contact center locations, and the equipment and software needed to implement remote communications is widely available. It is also attractive to recruit individuals for positions as remote agents since candidates can be offered the benefit of foregoing long commutes to geographically distant offices, flexible schedules, and reduced reliance on child care or other similar circumstances. Furthermore, remote agent opportunities are particularly beneficial to persons with disabilities who may have special needs and require more flexible working conditions and schedules.

Previous attempts have been made to implement remote agent operations such as described in U.S. Pat. No. 5,459, 780 to Sand (the '780 patent); U.S. Pat. No. 5,291,551 to Conn et al. (the '551 patent); U.S. Pat. No. 5,073,890 to Danielsen (the '890 patent); all of which are incorporate herein by reference.

U.S. Pat. No. 5,459,780 to Sand (the '780 patent) describes a work at home agent ACD comprising an ACD host switch, an agent switch, an intelligent agent workstation, a data network, a home agent server ("HAS"), a host processor, and a management information system ("MIS"), whereby call traffic routed through a public switched telephone network ("PSTN") is distributed by the ACD host switch to the agent switch and received by the workstation. The workstation receives voice signals from the agent switch and also transmits connection status, order processing, and other information via the data network to the HAS. The HAS transmits the data to a host processor which in turn communicates with the MIS which monitors the distribution traffic and controls the ACD host switch to optimize call distribution, particularly when caller traffic justifies maintaining an open voice path to the remote agent to reduce call setup time.

U.S. Pat. No. 5,291,551 to Conn et al. (the '551 patent) describes a home agent telecommunication system comprising one or more home agents having a voice terminal and a computer terminal to access a transaction processing center. The transaction processing center may comprise a catalog order facility, a travel reservation entity, a stock brokerage, or the like. A customer call is received by a local exchange carrier ("LEC") which is routed to a PSTN and received by a second exchange which serves the geographic area encompassed by the transaction processing center. The transaction processing center designates the home agent assigned to receive the call which is routed across a combined voice and data line. The perceived benefit of this system is that the home agent is not continuously connected to the transaction processing center on a line that may remain idle much of the time.

U.S. Pat. No. 5,073,890 to Danielsen (the '890 patent) describes a remote agent operation for automatic call distributors utilizing ISDN comprising a remote agent position, a customer telephone, and a remote database, whereby a session initiates when the remote agent position is located near a local switch which connects to an ACD host switch via a telecommunications network. A front-end process to direct calls from the customer telephone to an available remote agent position. The local switch converts message data from a SS7 network format to an ISDN standard used by the remote agent position. The perceived benefit of this system is the economical placement of remote agents using ISDN to nearby local telecommunication switching systems instead of requiring them to be close to the ACD host switch.

However, none of the systems in the prior art describe a remote agent system capable of servicing multimedia contacts in one or more different contact centers. A typical contact center may only require the use of remote agents during certain periods of high inbound call traffic. Therefore, it is costly and inefficient to pay for a dedicated remote agent that is not being utilized during periods of low caller traffic. Conversely, should an unexpected surge in caller traffic occur, current systems lack the ability to immediately access a base of highly qualified, motivated remote agents. In circumstances such as these, which are commonplace in the field of the subject invention, it is of great benefit to have a pool of remote agents which can be assigned to more than one contact center and be efficiently utilized when and where they are most needed.

Moreover, past attempts to implement remote agent systems have only achieved limited success because they effectively only relocate agents from a fixed facility to a remote facility which does nothing to improve the efficiency of utilization of agents. The mere act of relocating an agent does not erase the fact that the agent remains a dedicated employee who must be compensated regardless of whether there is a sufficient call volume to keep him or her occupied during an entire shift. It would be very attractive for a contact center to be able to utilize non-dedicated remote agents, that is, agents who not only work from a remote location but also are not dependent on a single contact center for all of their work. Such a system would allow a contact center to schedule an agent for very brief periods of time (30 minutes, for example) and for non-contiguous blocks of time, possibilities which would not be feasible with a dedicated agent. These possibilities would open up because the remote, non-dedicated, agent would be able to "fill-in" empty bocks of time within his or her work schedule by making him or herself available to other contact centers during those times. In such a system, a contact center could schedule as many agents as it needs for exactly the time blocks needed without risking the quality of the services provided or the dissatisfaction of the remote agents utilized.

Past attempts to implement remote agent systems have, in addition, been expensive because remote agents are simply treated as regular employees of the contact center and, consequently, it is necessary for the contact center to equip their remote locations similarly to those of a local agents. This can be very expensive when a large number of remote agents are needed.

In addition, the simple relocation of agents to remote locations does not provide any incentive for the remote agent to be more efficient since he or she is not personally vested in the additional expense incurred in equipping the remote location.

From the remote agent's point of view, working for a singular contact center has distinct disadvantages. Most notably, the income base of the remote agent may be negatively affected if the singular contact center is not able to efficiently utilize him or her. For example, many contact centers servicing catalog sales may experience a flood of calls during the holiday season whereby there is sufficient work for the remote agent to handle the overflow. However, during the off-season, the contact center may not have the additional call volume and thus will be unable to fully utilize or employ the remote agent. Furthermore, should a remote agent wish to handle additional work, he or she is locked into the schedule of a single contact center and its ability to provide work to the agent. If more than one contact center is available for assignment, a remote agent will be able to choose from a wider range of work schedules and expected call volumes thus permitting a better fit to the particular lifestyle circumstances of the agent.

Consequently, there is a need in the art for a remote agent system whereby the remote agents are capable of servicing calls for a singular contact center as well as a plurality of different contact centers.

There is a further need in the art for a remote agent system that permits flexibility in scheduling a single remote agent to multiple contact centers so as to allow for maximum efficiency in utilizing the working hours available to the agent.

There is a further need in the art for a remote agent system that permits the remote agent to select assignment from among a choice of work schedules and call volume levels pertaining to one or more contact centers.

There is a further need in the art for a remote agent system that incorporates the ability for remote agents to become personally vested in the success and efficiency of the system by making a personal investment in the procurement of physical equipment needed to establish the remote location, in the acquisition of skills through specialized training, and in the payment of recurring expenses associated with providing contact center services.

There is a further need in the art for a remote agent system that permits maximum flexibility in the scheduling of agents so that a contact center can schedule the number of agents it expects to need during the times they are needed.

There is a further need in the art for a remote agent system which provides a highly dynamic system for handling emergency crisis cases with previously trained and authorized remote agents that can be summoned in the event their services are needed, even on an infrequent basis.

Finally, there is also a need in the art for a contact center system which permits performance evaluation and management of the remote agent in real-time.

SUMMARY OF THE INVENTION

The present invention solves significant problems in the art by providing a method of providing Intelligent Queuing and Routing Engine ("IRQE") services to one or more remotely located agents trained to service calls for one or more of client contact centers, comprising the steps of receiving a customer-initiated call (which can consist of a voice communication, e-mail, internet chat, or other type of communication) at a contact center, routing the customer-initiated call through the contact center's IRQE via an electronic telecommunications network to a voice or data network switch, the voice or data switch transmitting an array of caller information relating to the customer-initiated call to a network coordinator servicing a one or more different contact centers, the network coordinator identifying at least one remotely located agent trained and authorized to receive the customer-initiated call for the contact center, and the network coordinator routing the customer-initiated call from the customer to the designated remote agent.

The array of caller information resolved from the voice or data network switch may include the caller's telephone number, whether they are calling from a business or residential line, past caller history and/or caller demographics.

The network coordinator is able to track the number of calls handled by a remotely located agent for the contact center and can provide payroll services for the contact center on behalf of the remotely located agent. Alternatively, the remote agent may be engaged and compensated directly by the network coordinator who in turn has an agreement in place with the contact center for compensation for its services. The network coordinator may also maintain statistical records of each customer-initiated call and provide them to the contact center.

As an alternative to processing the calls through the contact center's IRQE, incoming customer-initiated calls may be routed directly to the voice or data network switch, bypassing the contact center entirely until a transaction is logged by the remotely located agent. In order to facilitate communication between the network coordinator, the contact center and the remote agent without interfering with the handling of the customer-initiated call, electronic mail, electronic chat or instant messaging may be utilized.

By accessing the features of the voice and/or data network switch, the network coordinator may monitor the communication taking place in the customer-initiated call and provide the contact center with access to the communication. Using the same technology, the remotely located agent handling a customer-initiated call may request assistance from the contact center wherein a supervisor at the call center may tap into the voice and/or data network switch to assist in servicing the customer-initiated call.

Accordingly, it is an object of the present invention to provide a network coordinator system that pools a plurality of remote agents that are specially trained to accept and process calls for one or more different contact center clients. The network coordinator may provide quality control, voice and data connections, flexible scheduling, recruiting and a training infrastructure to enable the system.

It is another object of the present invention to provide a highly dynamic system for handling emergency crisis cases with previously trained and authorized remote agents that can be summoned in the event their services are needed, even on an infrequent basis. For example, federal regulations in the United States require airlines to provide contact center services in the event of an aviation emergency. However, it would be impractical to maintain a large full-time contact center that is only utilized a few times every year. Using the system in the present invention, hundreds of remote agents could be trained to handle inquiry calls from concerned family members in the event an emergency occurs and those remote agents could be contacted and put online in minutes.

It is another object of the present invention to provide a viable vocation to a highly qualified workforce that for various reasons must or prefers to work from home. For many individuals with disabilities, infirmities or other limitations on their physical capacity, it may be impossible to travel to a traditional workplace. By providing them with the opportunity to work from home or some other convenient remote location, this undervalued workforce may be utilized to the mutual benefit of both the contact center and remote agent.

It is another object of the present invention to enable the gainful employment of individuals who, because of lifestyle or health reasons, are unable to abide by a traditional work schedule. The present invention would permit individuals to work during off-hours, to work in blocks of time that are non continuous, and to have a schedule which varies from week to week.

It is another object of the present invention to provide a remote agent system that incorporates the ability for remote agents to become personally vested in the success and efficiency of the system by making a personal investment in the procurement of physical equipment needed to establish the remote location, in the acquisition of skills through specialized training, and in the payment of recurring expenses associated with providing contact center services.

An advantage of the invention is that, through a network coordinator, contact centers clients have access to a large pool of highly trained, motivated individuals that are generally compensated based upon performance, such as, without limitation, the number of calls handled in a predetermined time frame. The contact center clients minimize the capital outlay necessary to service highly fluctuating customer initiated inbound calls.

DETAILED DESCRIPTION OF THE PREFERRED EMBODIMENTS

Figure 1:
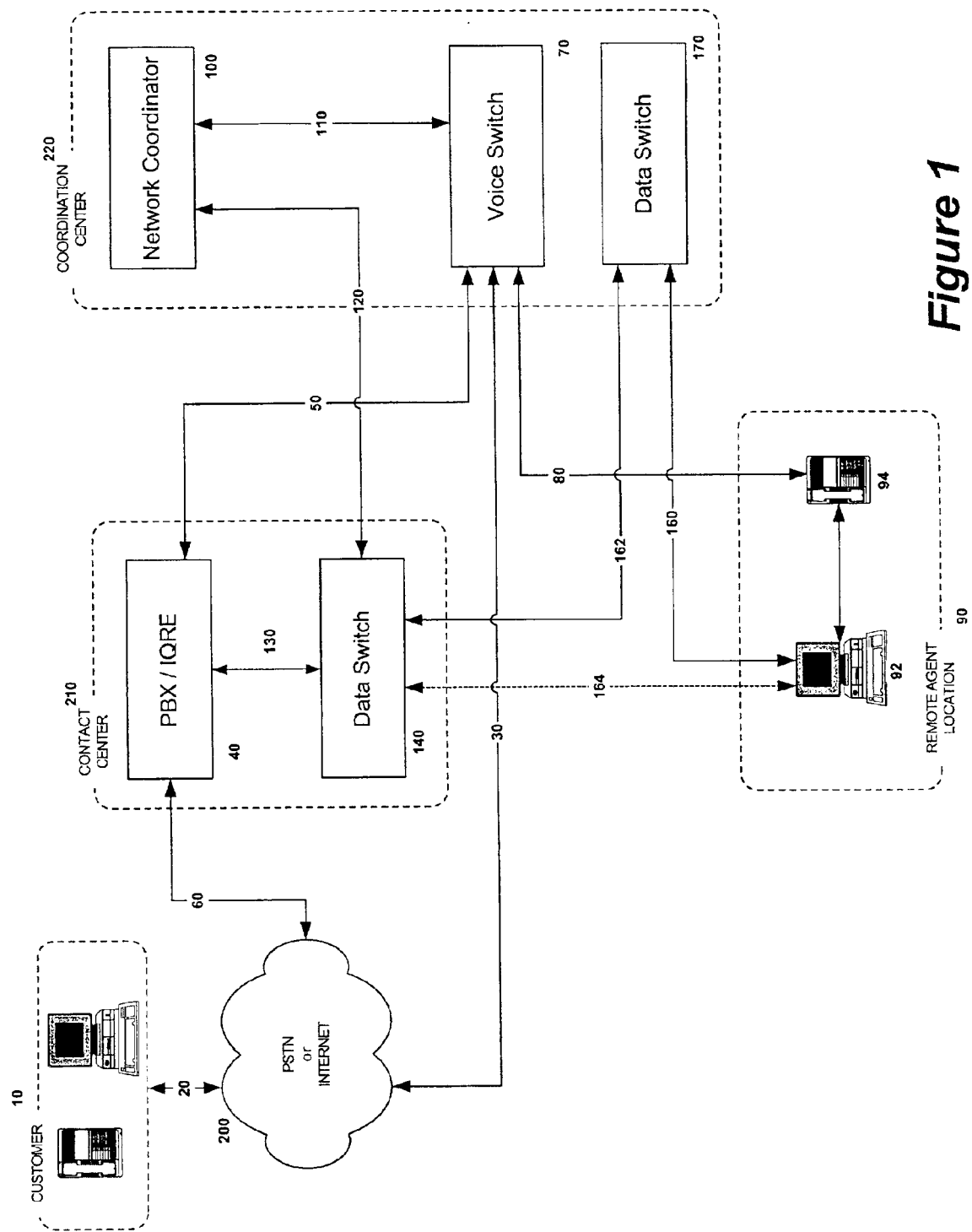
FIG. 1 is a flow diagram of the operation of the present invention illustrating the general telecommunication pathways for voice communications.

In a preferred embodiment of the invention, remote agents have the opportunity to select from one or more client training courses which are paid for, partly or entirely, by the remote agent. For example, a remote agent may select training to handle sales for a catalog ordering company and an airline reservation company. Moreover, the remote agent is required to pay for adequately equipping his or her home and/or office to handle the particular type of operation needed by the client, for training, and for recurring operating expenses such as telephone and ISP charges. Because the remote agent has a personal investment in the equipment, training, and recurring expenses, the remote agent has a vested interest in his or her success which greatly reduces the turnover rate.

Once training is completed and the remote agent is authorized to handle calls for one or more clients, the remote agent is provided with the appropriate communications connections to service each client. The equipment can comprise both a voice and data connection. The voice and data path may be combined using well known configurations such as integrated services digital network ("ISDN") or a digital subscriber line ("DSL") (including the several available service variants such as ADSL, SDSL, HDSL and the like) whereby data and voice are distinguished as packets of information split into a plurality of channels. In a preferred embodiment, "voice over internet protocol" or "VoIP" is utilized to connect the voice path from the voice switch to the remote agent. Plain old telephone service ("POTS") or other technologies such as an off premises extension ("OPX") may also provide a data and voice connection to handle transactions.

At the core of the system is a network coordinator. The network coordinator is able to directly communicate with both the remote agent and the call center client. The network coordinator maintains a database on each of the remote agents which describes what call center clients the remote agent is trained and authorized to work for. The network coordinator also maintains a live database of service schedules posted by, or on behalf of, the contact center client, which are "advertised" to those remote agents who are trained and authorized to serve that client. The network coordinator can be integrally tied to every transaction as the remote agents are generally paid in proportionate relation to the volume of calls handled, be it on a per-call basis, an hourly basis or on a fixed price basis. In a preferred embodiment, the network coordinator tracks each call transaction between the remote agent, the customer and the call center client. The network coordinator then assembles real-time statistics on every aspect of the transaction. Because the network coordinator is directly tied to the voice and/or data network switch, it can provide seamless supervisory assistance and silent monitoring abilities for each client call center. The network coordinator can also manage remote agents to ensure that they meet the agreed upon service requirements of the contact center. The service requirements can specify parameters such as, for example, the maximum number of rings before a call is answered, the maximum hold time, the maximum length of a conversation, and the like. In a preferred embodiment, the remote agents, network coordinator and call center client all have real-time e-mail and/or electronic chat capability for instantaneously communicating with each other.

The remote agent's computer generally runs two applications simultaneously. The first application is tied to a network coordinator that oversees the entire remote agent process for one or more clients. The first application provides call connection status, remote agent availability and other real-time information to the network coordinator. This permits the network coordinator to determine which remote agents are actively handling calls and which agents are idle. If one or more remote agents scheduled to handle calls for a particular client are idle for an extended period of time, the network coordinator may give the remote agents the opportunity to handle calls for a client for which they are trained that needs additional assistance. The second application is a direct connection to a transactional computer for call processing. For example, a remote agent handling sales for a catalog would enter in the customer's selection of merchandise, shipping address and credit card information. This may be accomplished using whatever protocol and terminal emulation is necessary for ordering processing. For example, for a mainframe system, the remote agent may utilize a 3270 terminal emulation through a TCP/IP-based telnet application. However, the terminal connection may be web-based (HTML), ANSI, VT-100 or other configuration depending on the network type being utilized.

In a preferred embodiment of the invention, both the call centers and the remote agents are customers of the network coordinator. Call centers pay a usage fee to access the remote agents trained for its facility. Remote agents pay a monthly service fee. The remote agents are utilized both on a scheduled and overflow emergency basis.

Referring initially to FIG. 1 of the drawings, in which like numerals indicate like elements throughout the several views, in a first preferred embodiment a customer-initiated voice call 10 may travel by local lines 20, 60 through a public switched telephone network ("PSTN") or through the Internet 200 to a contact center client 210. The contact center client 210 typically has an existing IRQE and/or public branch exchange ("PBX") system 40 that has the ability to receive and transfer calls to remote locations. A PBX is a telephone system within an enterprise that switches calls between enterprise users on local lines while allowing all users to share a certain number of external phone lines. Most PBX switches also have the ability to be networked together via leased lines. This allows remote offices to be "tied" together reducing call traffic and producing substantial long distance rate savings.

Calls from the contact center PBX/IRQE 40 may be forwarded to the remote agent coordination center 220 by a second connection 50. The second connection 50 may comprise a high-bandwidth connection such as a 1.544 Mbps DS-1, 44.4736 Mbps DS-3, 800 service, or comparable connection. The second connection 50 in turn connects the call to a voice switch 70. Alternatively, the customer-initiated call 10 may bypass the contact center client 210 and PBX/IRQE 40 altogether and connect directly 30 to the voice switch 70.

The voice switch 70 is connected to a network coordinator 100 through a direct connection 110. The network coordinator 100 maintains a live database of service schedules posted by the contact center client which are "advertised" to remote agents who are trained and authorized to serve that client. Alternatively, the service schedules may be posted by the network coordinator 100 based on instructions from the contact center client. The service schedules comprise blocks of time during which the client would like remote agents to service calls from its contact center. All the available remote agents 90 trained and authorized to service calls for the particular contact center client 210 may review the service schedule and select or accept those blocks of time during which they would like to service the particular client's contact center. The network coordinator as well as the client are able to monitor which advertised time slots have been accepted by the remote agents and which remain unfilled in order to make appropriate staffing decisions.

The network coordinator 100 has the ability to be integrally tied to every transaction if it is so desired by the contact center client. This ability allows the network coordinator to gather necessary call statistics which may be needed since the remote agents 90 are generally paid in proportion to the volume of calls handled, be it on a per-call basis, an hourly basis or on a fixed price basis or through some other performance based methodology.

The direct connection 110 between the network coordinator 100 and the voice switch 70 enables the network coordinator to provide seamless supervisory monitoring of the calls without any intrusiveness. Furthermore, the network coordinator 100 may provide this "silent monitoring" to the contact center client 210 through data connection 50 to enable the client to evaluate the audio transactions that take place between the remote agent 90 and the customer 10. The direct connection 110 from the network coordinator 100 to the voice switch 70 enables either the network coordinator 100 or the contact center client 210 to provide supervisory assistance to the remote agent 90 as needed. The network coordinator 100 may also provide real-time call statistics to the contact center client 210 to evaluate the performance of the remote agent 90. In a preferred embodiment of the invention, the remote agent 90, the network coordinator 100 and the contact center client 210 have real-time email or electronic chat capability so that information may be distributed without interrupting any ongoing voice connections.

The remote agent 90 is equipped with voice communication means, such as a telephone 94 and data communication means provided by a networked workstation or personal computer 92. The voice communications means 94 and data communication means 92 are themselves networked to allow for seamless processing of voice and data. The telecommunication connections to and from the remote agent 90 are well known within the industry. In a preferred embodiment, "voice over internet protocol" or "VoIP" is utilized to connect the voice path 80 from the voice switch 70 to the remote agent 90. Alternatively, voice communications 80 between the voice switch 70 and the remote agent 90 may be established by an off premises extension ("OPX"). An OPX generally refers to any telephone extension not located on the same premise as the telephone system of which it is a part.

In the preferred embodiment, a data connection between the remote agent 90 and a data switch 140 at the client contact center 210 travels through a data switch 170 at the coordination center 220 via data lines 160 and 162. The data switch 170 at the coordination center 220 acts as a concentration point for all remote agents which service the subject contact center. Alternatively, the remote agent 90 may have a direct data connection 164 to the data switch 140 at the client contact center 210. The data received by the data switch 140 at the client contact center 210 is extended through a data path 130 to the PBX/IRQE 40 for caller transaction information. In a preferred embodiment, the data paths 164 and 160 which originate from the remote agent may utilize POTS, DSL or ISDN depending on the bandwidth requirements and available equipment. The data path 162 which connects the data switches 140 and 170 is best established using a data frame relay but may me also established using other technologies such as Virtual Private Network ("VPN"), T1, NxT1, and the like. This is sized based on the contact centers application bandwidth demand. Frame relay is a telecommunication service designed for cost-efficient data transmission for intermittent traffic between LANs and between end-points in a WANs. Frame relay puts data in a variable-size unit called frames and leaves any necessary error correction (retransmission of data) up to the end-points, which speeds up overall data transmission. The data path between the data switch 140 and the PBX/IRQE 40 at the contact center 210 is preferably a high-speed LAN connection 130.

In a preferred embodiment the network coordinator 100 provides payroll support for the contact center client or clients serviced by the remote agent 90. Alternatively, if the remote agent 90 is engaged directly by the network coordinator through an agreement with the client contact center, no payroll services are provided by the network coordinator. The network coordinator 100 inherently monitors the call status, duration, availability and other information relating to the remote agent 90. This information may be compiled for accounting on a per-call basis, hourly basis, sales basis or whichever method of compensation is agreed upon. The accounting information may be directly delivered from the network coordinator 100 to the contact center client 210 through a data connection 120 to the data switch 140.

Figure 2:
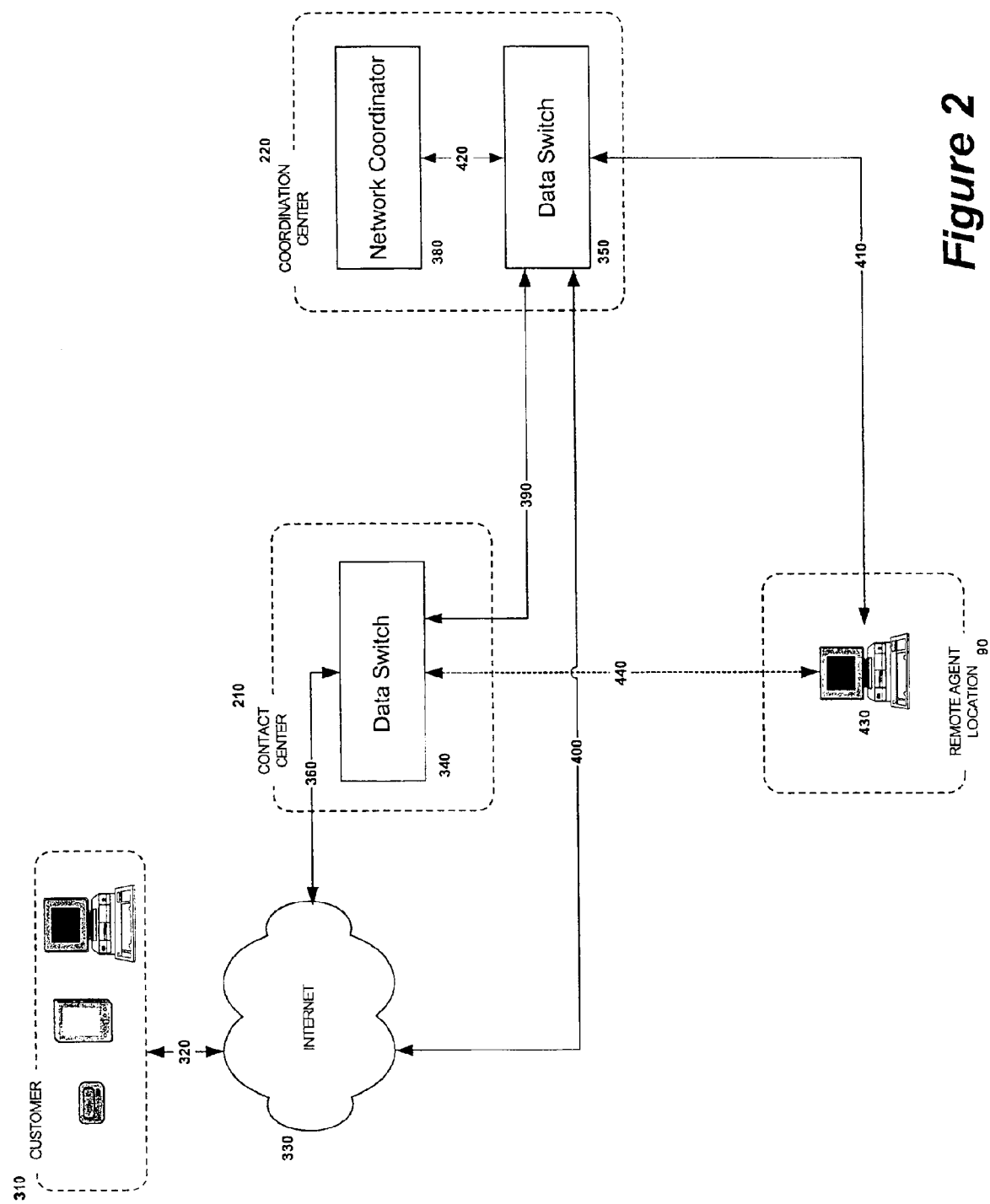
FIG. 2 is a flow diagram of the operation of the present invention illustrating the general telecommunication pathways for non-voice communications.

Referring next to FIG. 2 of the drawings, in a second preferred embodiment a customer-initiated "electronic call" (that is, customer initiated electronic communications via electronic chat, e-mail, video-conferencing, and the like) 310 may travel by local data lines 320 through the Internet 330 to a contact center client 210. The contact center client 210 is equipped with a data switch 340 that has the ability to receive and link the electronic calls to remote locations.

Electronic calls from the contact center data switch 340 may be forwarded to the coordination center 220 by a data connection 390. In an alternate embodiment, the customer-initiated electronic call 310 may bypass the contact center client 210 altogether and connect directly 400 to the remote agent coordination center 220. In either scenario, the electronic call is received by a data switch 350 at the coordination center 220 which then queries the network coordinator 380 through a data connection 420. The network coordinator 380 in turn forwards the electronic call to a suitable remote agent 90. The data connections 390 and 400 may comprise a high-bandwidth data connection such as a frame relay, NxT1, VPN or comparable connection. The data connection 420 between the network coordinator 380 and the data switch 350 at the coordination center 220 is preferably a high-speed LAN connection.

The network coordinator 380 maintains a live database of service schedules posted by the contact center client which are "advertised" to remote agents who are trained and authorized to serve that client. Alternatively, the service schedules may be posted by the network coordinator 380 based on instructions from the contact center client. The service schedules comprise blocks of time during which the client would like remote agents to service electronic calls from its contact center. All the available remote agents 90 trained and authorized to service electronic calls for the particular contact center client 210 may review the service schedule and select or accept those blocks of time during which they would like to service the particular client's contact center. The network coordinator as well as the client are able to monitor which advertised time slots have been accepted by remote clients and which remain unfilled in order to make appropriate staffing decisions.

The network coordinator 380 has the ability to be integrally tied to every transaction if it is so desired by the contact center client. This ability allows the network coordinator to gather necessary call statistics which may be needed since the remote agents 90 are generally paid in proportion to the volume of electronic calls handled, be it on a per-call basis, an hourly basis or on a fixed price basis or through some other performance based methodology.

The remote agent 90 is equipped with data communication means provided by a networked workstation or personal computer 430. The telecommunication connections to and from the remote agent 90 are well known within the industry. In this preferred embodiment the remote agent 90 is has a direct data connection 410, preferably a high-bandwidth data connection such as a DSL, ISDN, Cable Modem, or comparable connection, to the data switch 350 at the coordination center 220. Alternatively, the direct data connection 410 may utilize POTS depending on the bandwidth requirements and available equipment. The direct connection 410 between the data switch 350 and the remote agent 90 enables the network coordinator to link the remote agent 90 to the customer and provides data access for seamless supervisory monitoring of the electronic calls. In an alternate embodiment, the remote agent may also be connected directly to the data switch 340 at the contact center client's location through a direct data connection 440 similar to that which connects it to the network coordinator. This would allow the contact center client 210 to monitor the electronic call in the same fashion the network coordinator 380 can. The direct data connections 410, 440 also enable either the network coordinator 380 or the contact center client 210 to provide assistance to the remote agent 90 as needed. The network coordinator 380 may also provide real-time call statistics to the contact center client 210 to evaluate the performance of the remote agent 90. In a preferred embodiment of the invention, the remote agent 90, the network coordinator 380 and the contact center client 210 have real-time email or electronic chat capability so that information may be distributed without interrupting any ongoing connections.

In a preferred embodiment the network coordinator 380 provides payroll support for the contact center client or clients serviced by the remote agent 90. Alternatively, if the remote agent 90 is engaged directly by the network coordinator through an agreement with the client contact center, no payroll services are provided by the network coordinator. The network coordinator 380 inherently monitors the call status, duration, availability and other information relating to the remote agent 90. This information may be compiled for accounting on a per-call basis, hourly basis, sales basis or whichever method of compensation is agreed upon. The accounting information may be directly delivered from the network coordinator 380 to the contact center client 210 through the data connection 390.

Figure 3:
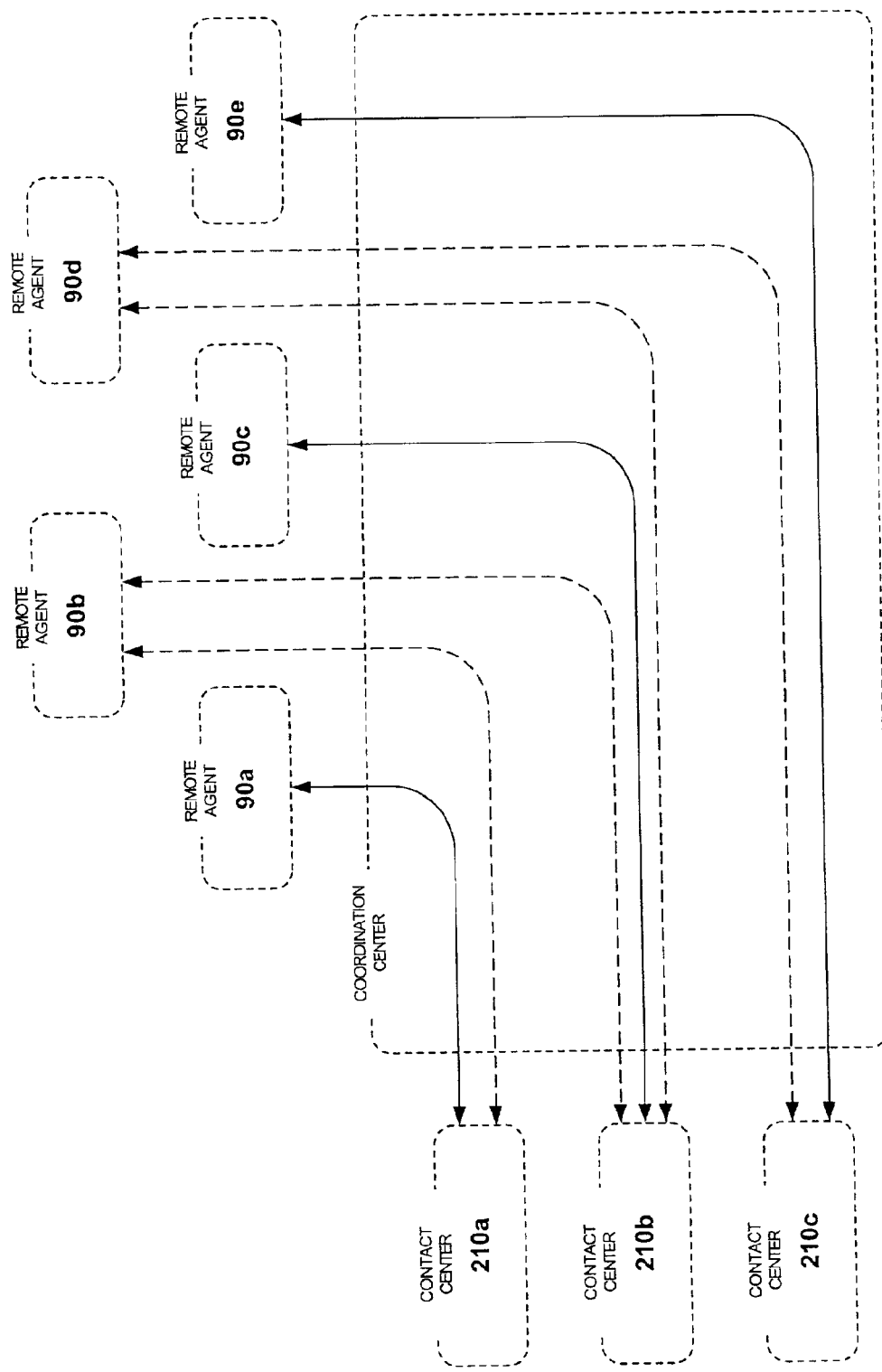
FIG. 3 is a flow diagram of the operation of the present invention illustrating the multi-client servicing design of the network.

FIG. 3 is illustrative of the general operation of the system whereby multiple contact center clients 210a–c are serviced by multiple remote agents 90a–e. As an example, remote agent 90b is trained and authorized to service calls from both call center client 210a and call center client 210b. Remote agent 90b is scheduled to work from 4:00 p.m. to 6:00 p.m. for call center client 210a. The schedule of remote agent 90b is registered with the network coordinator 100 whereby only authorized and scheduled remote agents may log on to the system to accept calls. The number of remote agents assigned to handle calls is predetermined by the call center client based on anticipated needs. However, suppose that in the example, remote agent 90b finds that call center client 210a overestimated its need for remote agents and remote agent 90b is idle. The network coordinator 100 may determine that call center client 210b requires additional assistance than previously forecasted. The network coordinator 100 then confirms that remote agent 90b has been trained and authorized to handle calls for call center client 210b and that the remote agent is idle. The network coordinator 100 then sends email to remote agent 90b offering a switch to accept customer-initiated calls for call center client 210b. The remote agent 90b may then switch over and begin accepting calls for call center client 210b.

From the remote agent's point of view, working for multiple contact centers has many advantages. Initially, the income base of the remote agent is not necessarily affected if one contact center is not able to efficiently utilize him or her since other contact centers will likely be available to provide work. Secondly, by working for multiple contact centers, a remote agent is not locked into the schedule of a single contact center. Because multiple contact centers are available for assignment, an agent will normally be able to choose from a wider range of work schedules and expected call volumes thus permitting a better fit to the particular lifestyle circumstances of the agent. The benefits derived from being able to service multiple contact centers encourage remote agents to train and qualify to handle multiple contact center clients. This benefit is returned to the contact center clients who gain a large pool of remote agents that may be activated on an ad hoc basis.

Referring back to FIG. 3, remote agents 90a, 9c, and 90e are trained and authorized to accept calls, designated by a solid line, only to a single call center client 40. However, remote agents 90b and 90d are trained and authorized to accept calls, designated by dashed lines, to multiple call center clients. By the implementation of the multiple client remote agent network method, the call center clients 40a–c greatly expand the size and capacity of their workforce with little to no additional expense. Simultaneously, the remote agents greatly expand their employment opportunities and work schedules by working for multiple call center clients.

It should be apparent to those skilled in the art that although the preferred embodiments of the present invention disclose remote agent systems in which customer-initiated calls are routed to remote agents, alternate embodiments of the invention in which the calls are initiated by remote agents and are routed to customers are possible using variants of the disclosed system.

Accordingly, it will be understood that the preferred embodiment of the present invention has been disclosed by way of example and that other modifications and alterations may occur to those skilled in the art without departing from the scope and spirit of the appended claims.

What is claimed is:

1. A method of distributing a customer-initiated call placed with a contact center to one or more remotely located agents trained to service calls for one or more contact centers, comprising the steps of:

receiving said customer-initiated call at a contact center;

deriving an array of caller information from said customer-initiated call;

transmitting said array of caller information to a coordination center servicing one or more contact centers;

identifying at least one remotely located agent trained and authorized to receive said customer-initiated call for said contact center; and directing said customer-initiated call to said identified remotely located agent.

2. The method of claim 1, wherein said customer-initiated call is placed through a communication method selected from among the class of communication methods consisting of: electronic mail, electronic chat, electronic video conferencing, electronic paging, instant messaging, voice messaging, short messaging service, and telephone.

3. The method of claim 1, further comprising the steps by said coordination center of tracking the number of calls received by said remotely located agent for said contact center and providing payroll services for said contact center on behalf of said remotely located agent.

4. The method of claim 1, further comprising the steps by said coordination center of maintaining statistical records of each customer-initiated call and providing said statistical records to said contact center.

5. The method of claim 1, further comprising the step of establishing simultaneous communication between said coordination center, said remotely located agent and said contact center.

6. The method of claim 5 wherein said simultaneous communication is established through a communication method selected from among the class of communication methods consisting of: electronic mail, electronic chat, electronic video conferencing, electronic paging, instant messaging, voice messaging, short messaging service, and telephone.

7. The method of claim 1, further comprising the steps by said coordination center of monitoring the content of communications taking place in said customer-initiated call and providing access to said content to said contact center.

8. The method of claim 7, further comprising the steps by said contact center of rendering assistance to said remotely located agent through a communication method selected from among the class of communication methods consisting of: electronic mail, electronic chat, electronic video conferencing, electronic paging, instant messaging, voice messaging, short messaging service, and telephone.

9. A method of distributing a customer-initiated call to one or more remotely located agents trained to service calls for one or more contact centers, comprising the steps of:

receiving said customer-initiated call at a coordination center servicing one or more call centers;

deriving an array of caller information from said customer-initiated call;

identifying at least one remotely located agent trained and authorized to receive said customer-initiated call for said contact center; and directing the customer-initiated call to said identified remotely located agent.

10. The method of claim 9, wherein said customer-initiated call is placed through a communication method selected from among the class of communication methods consisting of: electronic mail, electronic chat, electronic video conferencing, electronic paging, instant messaging, voice messaging, short messaging service, and telephone.

11. The method of claim 9, further comprising the steps by said coordination center of tracking the number of calls received by said remotely located agent for said contact center and providing payroll services for said contact center on behalf of said remotely located agent.

12. The method of claim 9, further comprising the steps by said coordination center of maintaining statistical records of each customer-initiated call and providing said statistical records to said contact center.

13. The method of claim 9, further comprising the step of establishing simultaneous communication between said coordination center, said remotely located agent and said contact center.

14. The method of claim 13 wherein said simultaneous communication is established through a communication method selected from among the class of communication methods consisting of: electronic mail, electronic chat, electronic video conferencing, electronic paging, instant messaging, voice messaging, short messaging service, and telephone.

15. The method of claim 9, further comprising the steps by said coordination center of monitoring the content of communications taking place in said customer-initiated call and providing access to said content to said contact center.

16. The method of claim 15, further comprising the steps by said contact center of rendering assistance to said remotely located agent through a communication method selected from among the class of communication methods consisting of: electronic mail, electronic chat, electronic video conferencing, electronic paging, instant messaging, voice messaging, short messaging service, and telephone.

17. A method of distributing a customer-initiated call placed with a contact center to one or more remotely located agents trained to service calls for one or more contact centers, comprising the steps of:

receiving said customer-initiated call at a contact center wherein said customer-initiated call is placed through a communication method selected from among the class of communication methods consisting of: electronic mail, electronic chat, electronic video conferencing, electronic paging, instant messaging, voice messaging, short messaging service, and telephone;

deriving an array of caller information from said customer-initiated call;

transmitting said array of caller information to a coordination center servicing one or more contact centers;

identifying at least one remotely located agent trained and authorized to receive said customer-initiated call for said contact center;

directing said customer-initiated call to said identified remotely located agent;

said coordination center tracking the number of calls received by said remotely located agent for said contact center and providing payroll services for said contact center on behalf of said remotely located agent;

said coordination center maintaining statistical records of each customer-initiated call and providing said statistical records to said contact center;

establishing simultaneous communication between said coordination center, said remotely located agent and said contact center wherein said simultaneous communication is established through a communication method selected from among the class of communication methods consisting of: electronic mail, electronic chat, electronic video conferencing, electronic paging, instant messaging, voice messaging, short messaging service, and telephone;

monitoring the content of communications taking place in said customer-initiated call and providing access to said content to said contact center; and said contact center rendering assistance to said remotely located agent through a communication method selected from among the class of communication methods consisting of: electronic mail, electronic chat, electronic video conferencing, electronic paging, instant messaging, voice messaging, short messaging service, and telephone.

18. A method of distributing a customer-initiated call to one or more remotely located agents trained to service calls for one or more contact centers, comprising the steps of:

receiving said customer-initiated call at a coordination center servicing one or more call centers wherein said customer-initiated call is placed through a communication method selected from among the class of communication methods consisting of: electronic mail, electronic chat, electronic video conferencing, electronic paging, instant messaging, voice messaging, short messaging service, and telephone;

deriving an array of caller information from said customer-initiated call;

identifying at least one remotely located agent trained and authorized to receive said customer-initiated call for said contact center;

directing said customer-initiated call to said identified remotely located agent;

said coordination center tracking the number of calls received by said remotely located agent for said contact center and providing payroll services for said contact center on behalf of said remotely located agent;

said coordination center maintaining statistical records of each customer-initiated call and providing said statistical records to said contact center;

establishing simultaneous communication between said coordination center, said remotely located agent and said contact center wherein said simultaneous communication is established through a communication method selected from among the class of communication methods consisting of: electronic mail, electronic chat, electronic video conferencing, electronic paging, instant messaging, voice messaging, short messaging service, and telephone;

monitoring the content of communications taking place in said customer-initiated call and providing access to said content to said contact center; and said contact center rendering assistance to said remotely located agent through a communication method selected from among the class of communication methods consisting of: electronic mail, electronic chat, electronic video conferencing, electronic paging, instant messaging, voice messaging, short messaging service, and telephone.

* * * * *